United States Patent
Bourbonnais et al.

(10) Patent No.: US 9,229,999 B2
(45) Date of Patent: Jan. 5, 2016

(54) USING AVERAGE REPLICATION LATENCY TO INFLUENCE ROUTING QUERY TRANSACTIONS

(71) Applicant: International Business Machines Corporation, Armonk, NY (US)

(72) Inventors: Serge Bourbonnais, Palo Alto, CA (US); Paul M. Cadarette, Hemet, CA (US); Michael G. Fitzpatrick, Raleigh, NC (US); Pamela L. McLean, Raleigh, NC (US); David B. Petersen, Great Falls, VA (US); Gregory W. Vance, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 13/835,464

(22) Filed: Mar. 15, 2013

(65) Prior Publication Data
US 2014/0279897 A1    Sep. 18, 2014

(51) Int. Cl.
*G06F 17/30* (2006.01)
(52) U.S. Cl.
CPC ................... *G06F 17/30575* (2013.01)
(58) Field of Classification Search
CPC ............. G06F 17/30575; G06Q 10/0633; G06Q 10/0639
USPC ................. 707/634, 713, 720; 718/105
See application file for complete search history.

(56) References Cited

U.S. PATENT DOCUMENTS

| | | | |
|---|---|---|---|
| 7,127,716 B2 * | 10/2006 | Jin et al. | 718/105 |
| 7,383,247 B2 | 6/2008 | Li et al. | |
| 8,332,390 B2 | 12/2012 | Yan et al. | |
| 2003/0153994 A1 * | 8/2003 | Jin et al. | 700/99 |
| 2003/0158951 A1 | 8/2003 | Primak et al. | |
| 2010/0318559 A1 * | 12/2010 | Yan et al. | 707/769 |
| 2013/0080388 A1 | 3/2013 | Dwyer et al. | |

* cited by examiner

*Primary Examiner* — Vincent F Boccio
(74) *Attorney, Agent, or Firm* — Cantor Colburn LLP; William A. Kinnaman, Jr.

(57) ABSTRACT

A data processing system and method of operation are disclosed. The data processing system includes a first site for processing data; a second site for processing data; and a transaction replay program configured to send a copy of data from the first site to the second site. A processor defines a maximum replication latency threshold and a reset threshold for the system, estimates a replication latency of a workload the system, switches the system to a first replication latency state when the estimated replication latency rises above the maximum replication latency and switches the system out of the first replication latency state to a second replication latency state when the estimated replication latency falls below the reset threshold.

20 Claims, 5 Drawing Sheets

USING AVERAGE REPLICATION LATENCY TO INFLUENCE ROUTING QUERY TRANSACTIONS

BACKGROUND

The present disclosure relates to workload distribution in a data processing system and, in particular, to methods for distributing workload performing query transactions throughout the data processing system according to a replication latency of an associated workload performing update transactions on the same data.

Various data processing methods include a plurality of independent processors that are separated by a distance. Data is distributed to the independent processors to perform various calculations. Proper operation of such processors depends on keeping the processing sites and their related databases closely in synchronization. Methods for distributing data to the processors when they are in sync are not useful once processors fall out of sync.

SUMMARY

According to one embodiment, a method of routing workload data to a plurality of processing sites includes: defining, using a processor, a maximum replication latency threshold and a reset threshold; estimating a replication latency of the workload for the plurality of sites; switching to an acute replication latency state for the plurality of processing sites when the estimated replication latency of the workload rises above the defined maximum replication latency threshold; and switching out of the acute replication latency state when the estimated replication latency falls below the defined reset threshold.

According to another embodiment, a data processing system includes: a first site configured to process data; a second site configured to process data; a transaction replay program configured to send a copy of data from the first site to the second site; and a processor configured to: define a maximum replication latency threshold and a reset threshold for the system, estimate a replication latency of a workload in the system, and switch the system to an acute replication latency state when the estimated replication latency rises above the maximum replication latency threshold and switch out of the acute replication latency state when the estimated replication latency falls below the reset threshold.

According to another embodiment, a method of operating a system of independent processing sites includes: defining, using a processor, a maximum replication latency threshold and a reset threshold of the system; estimating a replication latency of a workload in the system; switching the system to a first replication latency state when the estimated replication latency rises above the maximum replication latency threshold; and switching the system out of the first replication latency state to a second replication latency state when the estimated replication latency falls below the reset threshold.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
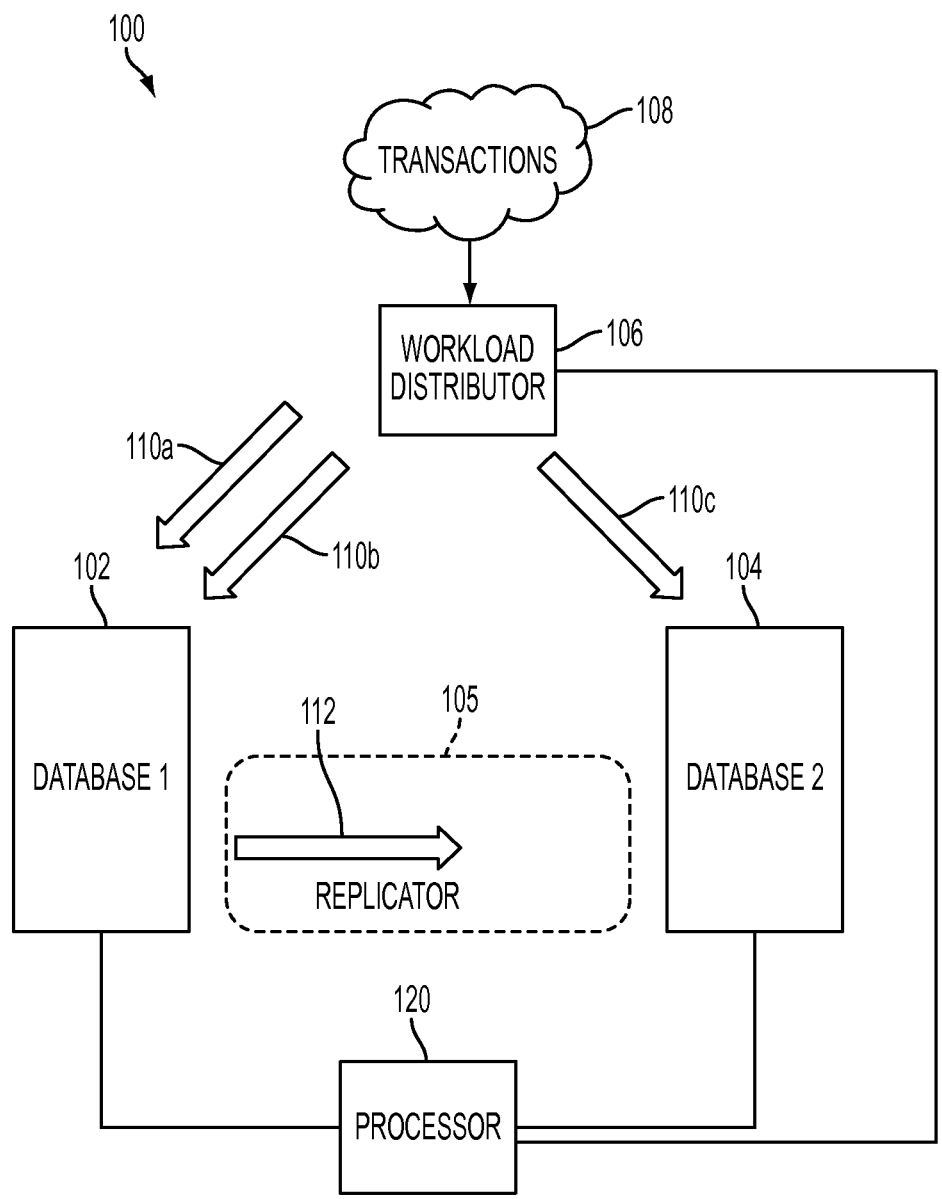
FIG. 1 shows an exemplary data processing system that is suitable for distributing a data workload according to a normal replication latency state.

FIG. 1 shows an exemplary data processing system 100 that is suitable for distributing a data workload according to the methods disclosed herein. The exemplary data processing system 100 includes a first database site or node 102 and a second database site or node 104 that may be separated by a distance from the first database site 102. In various embodiments, the first and second database sites 102 and 104 may be located in separate buildings, separate cities, etc., or otherwise separated by a selected distance, whereas the first database site 102 and the second database site 104 may be independent processor nodes. For illustrative purposes, FIG. 1 shows only a first and second database site 102 and 104. However, in alternate embodiments, more than two database sites may be communicatively coupled to each other in order to provide a data processing system 100 that may operate via the methods disclosed herein. Referring to the exemplary data processing system 100 of FIG. 1, the first database site 102 and the second database site 104 may run a same application. The data processing system 100 includes a workload distributor 106 that may receive data resulting from one or more transactions 108 and distributes workloads as appropriate to the first database site 102 and the second database site 104.

FIG. 1 illustrates the data processing system 100 in a normal replication latency state. A replication latency state may be a state determined by an amount one database leads or is "ahead" of another database. In the normal replication latency state, the data processing system 100 may distribute workloads using both a cross-site distribution configuration and a single-site distribution configuration. In a cross-site distribution configuration, query workloads 110b and 110c are sent to each of the first database site 102 and the second database site 140, respectively, wherein workloads 110b and 110c are copies of each other. Each database site 102 and 104 therefore has access and use of the same data. The cross-site distribution configuration may be an efficient configuration for workload distribution when the average replication latency of the workload in the system 100 is relatively small, since a small replication latency allows workload data access at both database sites.

In the single-site distribution configuration, update workloads 110a are sent to the leading database, which is selected to be the first database site 102 for illustrative purposes only, and the leading database then sends updates 112 to the lagging database, which is selected to be the second site 104 for illustrative purposes only. The first and second database sites 102 and 104 are kept synchronized by a software-based transaction replay program 105 for replicating workload data from one database site to another database site. In general, the transaction replay program 105 asynchronously copies the update data 112 from the leading database site to the lagging database site.

The normal replication latency state shown in FIG. 1 may occur in the data processing system 100 when the average replication latency of the system 100 is relatively small or within a selected tolerance. Replication latency is a measure of time elapsed, on average, between the completion of a transaction at a source processing site and its completion by the replication process at another data processing site. Thus, for the data processing system 100, the replication latency may be a time elapsed between completion of a transaction at the first database site 102 and its completion at the second database site 104 for a particular transaction. In an exemplary embodiment, the replication latency of the present invention may be an average of replication latencies measured over a selected time interval. In various embodiments, one or more processors 120 may be in communication with the first database site 102, the second database site 104 and the workload distributor 106 to obtain an estimate of the replication latency of the data processing system 100. In an exemplary embodiment, the one or more processors 120 estimate an average replication latency over all transaction replicated for a workload during a selected interval of time. The one or more processors 120 may then select the replication latency state of the data processing system 100 based on the estimated average replication latency, as discussed below with respect to FIG. 4.

The normal replication latency state of the system is illustrated in FIG. 1 by the arrow thicknesses. The arrows for query workload data 110b and 110c have a substantially equal thickness, indicating the overall balancing of the query workload among the first database site 102 and the second database site 104. The arrow for update workload 110a is of a thickness representative of the amount of update workload being sent to the first database site 102. The arrow representing replication data 112 has a thickness corresponding to the thickness of arrow 110a.

Figure 2:
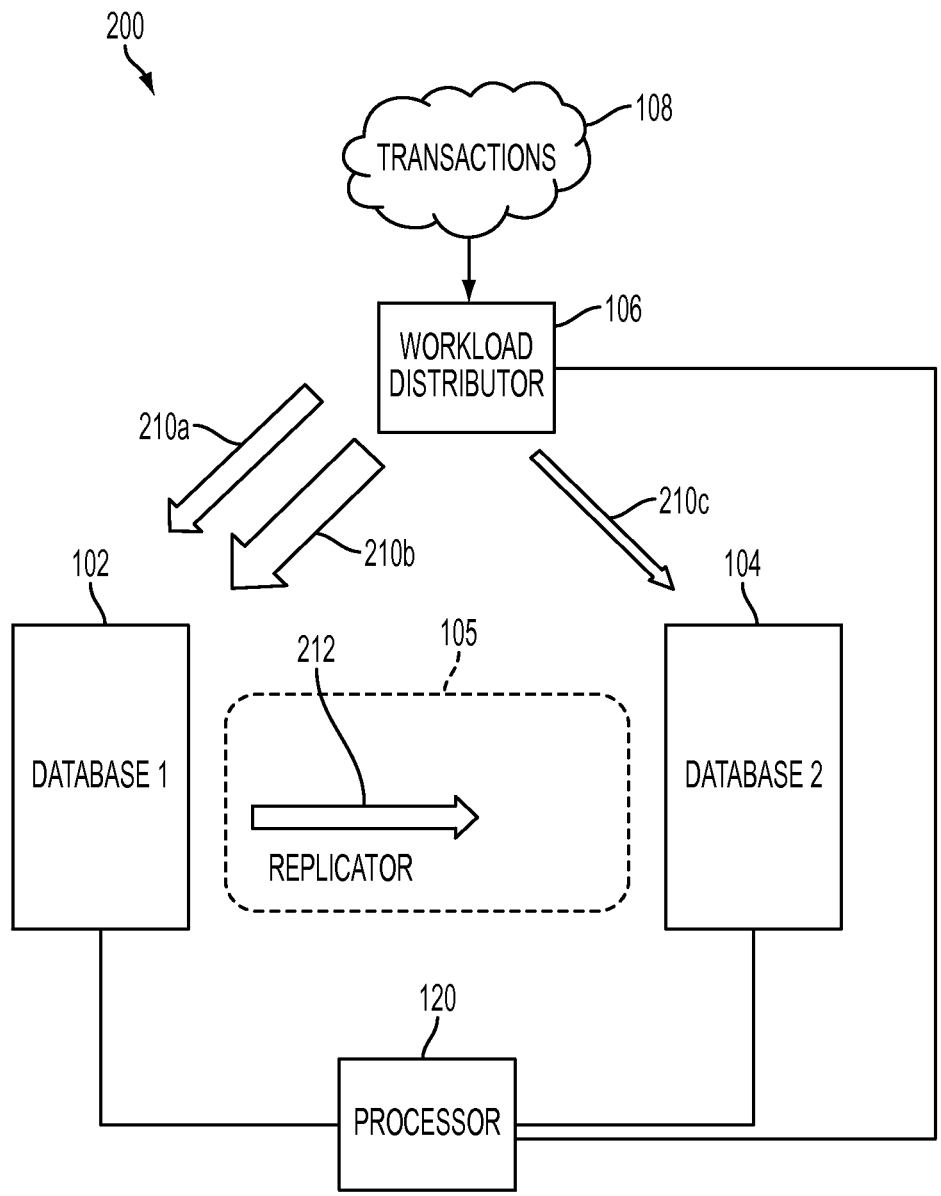
FIG. 2 illustrates operation of the exemplary data processing system of FIG. 1 in a severe or critical replication latency state.

FIG. 2 illustrates operation of the exemplary data processing system 100 in a severe or critical replication latency state 200. A severe or critical replication latency state 200 occurs when an estimated average replication latency of the system is no longer less than the selected tolerance. When the average replication latency becomes larger than the selected tolerance, processes at the lagging database site may be affected by this replication latency. The severe or critical replication latency state 200 differs from the normal replication latency state by a relative distribution of query transactions 210a among the database sites. In an exemplary operation, the number of update workloads 210a in the severe or critical replication latency state 200 is substantially the same as the number of update workloads 110a in the normal replication latency state 100. The number of query transactions 210b to the first database site 102 in the severe or critical replication latency state 200 is greater than the number of query transactions 110b to the first database site 102 in the normal replication latency state 100. Also, the number of query transactions 210c to the second database site 104 in the severe or critical replication latency state 200 is less than the number of query transactions 110c to the second database site 104 in the normal replication latency state 100. As the average replication latency increases, the processor 102 may determine a suitable distribution of query transactions among the first database site 102 and the second database site 104 based on the average replication latency. The severe and/or critical replication latency state of the data processing system 100 is illustrated by the size of the representative arrows. The arrow representing update transaction 210a in FIG. 2 is the same as the arrow representing update transaction 110a in FIG. 1. Also, the arrow representing replication data transfer 212 from the first database site 102 to the second database site 104 in FIG. 2 is substantially the same as the thickness of the corresponding replication arrow 112 in FIG. 1. However, the arrow representing query workload 210b in FIG. 2 is thicker than the corresponding arrow representing update transaction 110b in FIG. 1. The arrow representing query workload 210c in FIG. 2 is thinner than the corresponding arrows representing query workload 110c of the normal replication latency state shown in FIG. 1. In FIG. 2, while the first database site 102 is favored for query transactions over the second database site 104, in an alternate embodiment, the second database site 104 may be favored for query transactions over the first database site 102.

Figure 3:
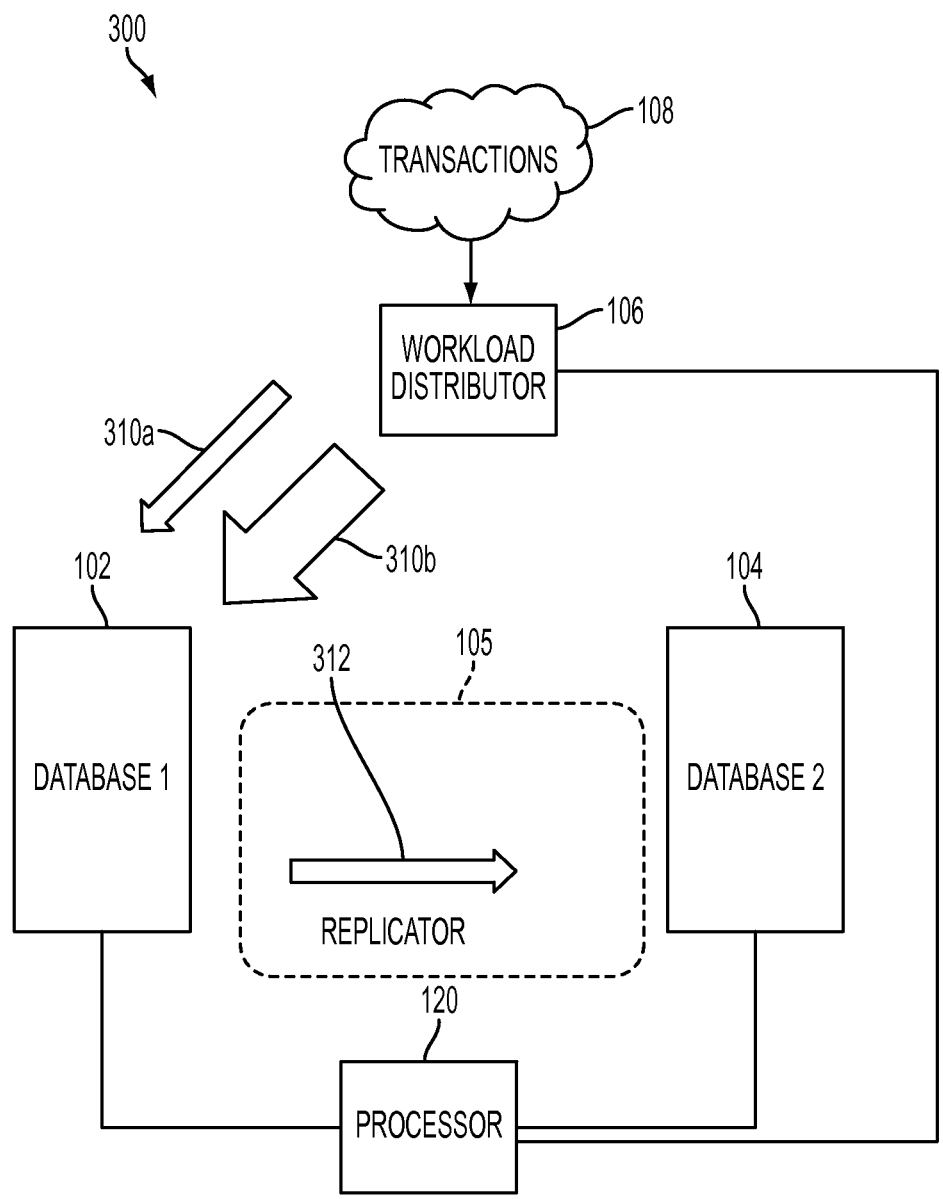
FIG. 3 shows operation of the exemplary data processing system of FIG. 1 in an acute replication latency state.

FIG. 3 shows operation of the exemplary data processing system of FIG. 1 in an acute replication latency state 300. The data processing system 100 may operate in the acute replication latency state 300 when the average replication latency increases above a selected threshold. In the acute replication latency state, the amount of update workloads 310a and the number of replication data transfers 312 does not change. However, all of the query transaction data 310b is sent via single-site distribution from the workload distributor 106 to the leading database site (e.g., the first database site 102). Subsequently, the lagging database site (e.g., the second database site 104) is always updated using the transaction replay program 105 to transfer data 312 from the leading database site. The single-site distribution configuration is employed in the acute replication latency state in order to avoid accessing data from a database site that lags too far behind the leading database site. The use of single-site distribution configuration is continued until the replication latency drops below a selected value, as discussed below with respect to FIG. 4. As shown in FIG. 3, the arrow representing update transactions 310a is substantially the same thickness as arrows 210a of FIGS. 2 and 110a of FIG. 1. Similarly, the arrow representing replication data transfers 312 is substantially the same thickness as arrow 212 of FIGS. 2 and 112 of FIG. 1. However, arrow representing query transaction 310b has a thickness that is greater than the corresponding arrow 210b of FIG. 2. Also, there is no arrow in FIG. 3 that corresponds to arrow 210c of FIG. 2.

Figure 4:
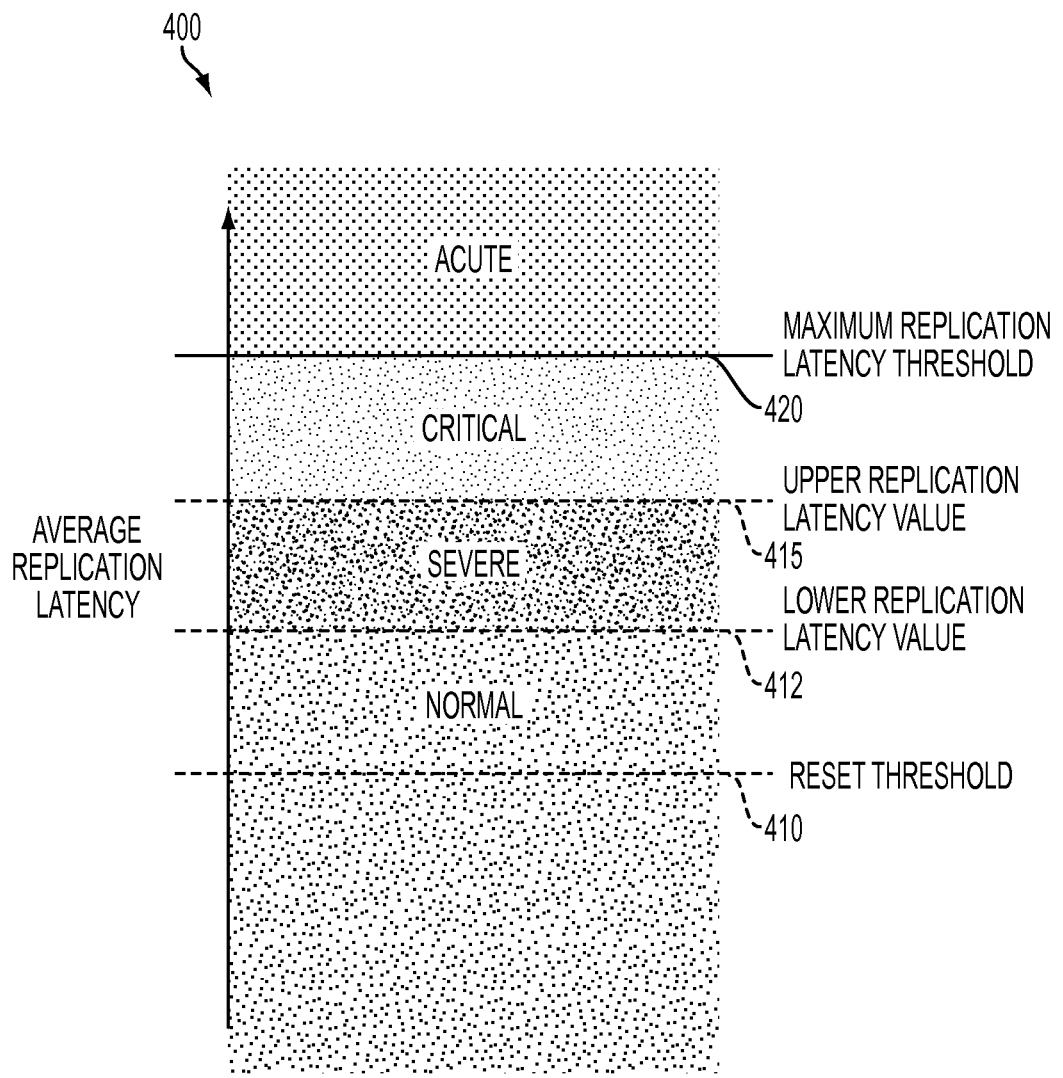
FIG. 4 illustrates various replication latency states and their relation to an average replication latency of a data processing system.

FIG. 4 illustrates various replication latency states and their relation to average replication latency. In exemplary embodiment of the present invention, a maximum replication latency threshold, i.e., an acceptable replication latency threshold 420 is defined. Also, a reset threshold 410 is defined that is less than the maximum replication latency threshold 420. Additionally, various replication latency states may be defined over the region of average replication latency values between the reset threshold 410 and the maximum replication latency threshold. An average replication latency of the update workload is estimated at processor 102, for example, by averaging the elapsed time it takes for each transaction that updates the database on the first database site 102 to be sent by the transaction replay program 105 to the second database site 104 and get stored therein. Replication latencies are estimated over a selected interval. The replication latency state of the workload is selected by comparing the average replication latency to various threshold and values, as discussed below.

In FIG. 4, estimated replication latency of the system is shown along a y-axis. Four exemplary replication latency states are shown and are labeled Normal, Severe, Critical and Acute. However, more or fewer replication latency states may be used in alternate embodiments of the invention. When the average replication latency of the workload is less than the lower replication latency value 412, then the system may be operated in a Normal replication latency state, as shown by the exemplary replication latency state illustrated in FIG. 1. When the average replication latency is greater than the lower replication latency value 412 but less than an upper replication latency value 415, then the system may be operated in a Severe replication latency state, as shown by the exemplary replication latency state illustrated in FIG. 2. When the average replication latency is greater than the upper replication latency value 415 but less than the maximum replication latency threshold 420, the system may operate in the Critical replication latency state, as shown by the exemplary replication latency state illustrated in FIG. 2. Finally, when the average replication latency is greater than the maximum replication latency threshold 420, the system operates in an Acute replication latency state, as illustrated in FIG. 3. The distribution of the query workload between the first database site 102 and the second database site 104 is therefore influenced by the current replication latency state, as depicted in FIG. 1-3.

All changes between replication latency states, except for a change to the Acute replication latency state, are reversible by reversing the direction of change of the average replication latency. For example, when the replication latency crosses above the lower replication latency value 412, the system switches from Normal to Severe replication latency state. Then when the replication latency crosses above the upper replication latency value 415, the system switches from Severe to Critical replication latency state. At this point, when the replication latency drops back below the upper replication latency value 415, the system switches from Critical replication latency state back to Severe replication latency state. Also, when the replication latency then drops back below the lower replication latency value 412, the system switches from Severe replication latency state back to Normal replication latency state. However, once the system switches to the Acute replication latency state by having the replication latency cross above the maximum replication latency threshold 420, the system remains in the Acute replication latency state until the average replication latency falls below the reset threshold 410. In general, the reset threshold 410 is located within a range of replication latencies defined by the normal replication latency state.

As an example, a maximum replication latency threshold is defined at 10 seconds and a reset threshold is defined at 5 seconds. A Severe replication latency state may be switched to when the average replication latency is within 25% of the maximum replication latency threshold, i.e., above 7.5 seconds. A Critical replication latency state may be switched to when the average replication latency is within 10% of the maximum replication latency threshold, i.e., above 9 seconds.

In the given example, when the average replication latency for the current interval is 2 seconds, the system is in a Normal replication latency state and query transactions are distributed to both sites using existing metrics, and replication latency is not used to influence routing. During the next interval, if the average replication latency is now 8 seconds, the replication latency state is Severe and the distribution of query transactions to both sites is influenced by replication latency. In the Severe replication latency state, the distribution of query transactions gradually favors the leading database site, where the data is more current than at the lagging site. During a subsequent interval, if the average replication latency becomes 12 seconds, the replication latency state becomes Acute and the distribution of query transactions are all being targeted to the leading database site since the lagging database site is too far our of synchronization. The replication latency state remains Acute until the average replication latency for a subsequent interval drops below the reset threshold, i.e., 5 seconds. Once the average replication latency for an interval falls below 5 seconds, the system transitions back to the Normal replication latency state.

Figure 5:
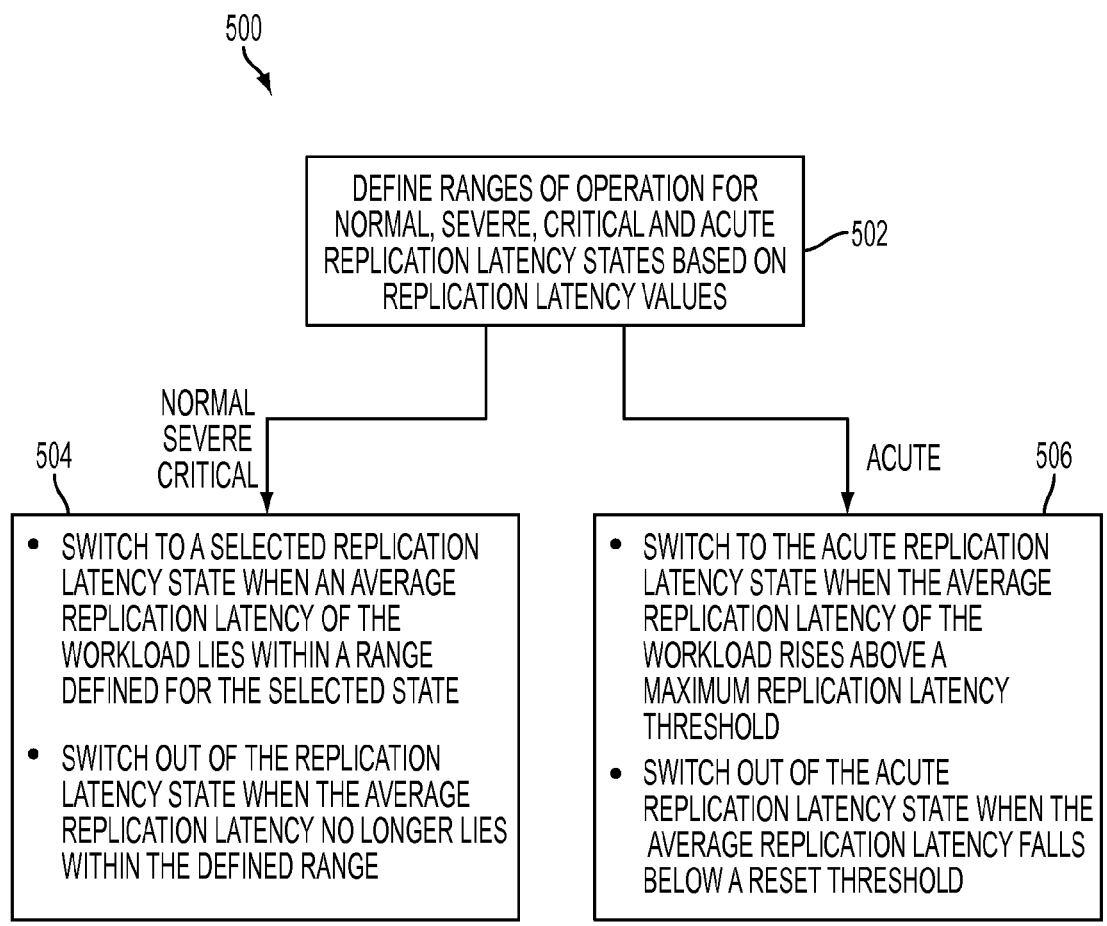
FIG. 5 shows a flowchart illustrating an operation of the exemplary data processing system of the present invention.

FIG. 5 shows a flowchart illustrating an operation of the exemplary system of the present invention. In block 502, operating ranges for Normal, Severe, Critical and Acute replication latency states are defined with respect to average replication latency values. In block 504, for Normal, Severe, and Critical replication latency states, one switches to a selected replication latency state when the average replication latency lies within the range defined for the selected replication latency state and switches out of the selected replication latency state when the average replication latency no longer lies within the defined range. In block 506, for Acute replication latency state, one switches into the Acute replication latency state when the average replication latency rises above the maximum replication latency threshold (420, FIG. 4) and switches out of the Acute replication latency state when the average replication latency drops below the reset threshold (410, FIG. 4).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of routing workload data to a plurality of processing sites, comprising:

defining, using a processor, a maximum replication latency threshold and a reset threshold;

providing an update workload to a first of the plurality of processing sites;

providing the update workload from the first of the plurality of processing sites to another of the plurality of processing sites;

estimating a replication latency of the workload for the plurality of sites using a difference in time between completion of a transaction on the update workload at a first of the plurality of processing sites and a completion of a replication process of the transaction at the other of the plurality of processing sites;

switching to an acute replication latency state for the plurality of processing sites when the estimated replication latency of the workload rises above the defined maximum replication latency threshold, wherein a query workload is provided to only the first of the processing sites in the acute replication latency state; and switching out of the acute replication latency state when the estimated replication latency falls below the defined reset threshold.

2. The method of claim 1, wherein the reset threshold is less than the maximum replication latency threshold.

3. The method of claim 1, wherein switching out of the acute replication latency state further comprises switching to a normal replication latency state of the plurality of sites.

4. The method of claim 3, wherein the query workload is distributed to each of the processing sites in the normal replication latency state.

5. The method of claim 3, further comprising defining at least one other replication latency state over a range of replication latency values between the normal replication latency state and the acute replication latency state, wherein the at least one other replication latency state favors use of a single-site distribution configuration.

6. The method of claim 5, further comprising switching from the normal replication latency state to the at least one other replication latency state when the estimated replication latency lies within the selected range of replication latency values defining the at least one other replication latency state.

7. The method of claim 1, further comprising estimating the replication latency by obtaining an average of replication latencies for the plurality of processing sites over a selected time interval.

8. A data processing system, comprising:
   a first processing site configured to perform a transaction on an update workload;
   a second processing site configured to perform a replication process of the transaction at the first processing site;
   a workload distributor for distributing a query workload to one or more of the first processing site and the processing second site;
   a transaction replay program configured to send a copy of update workload from the first site to the second site; and
   a processor configured to:
      define a maximum replication latency threshold and a reset threshold for the system,
      estimate a replication latency of a workload in the system from a difference in time between completion of the transaction at the first processing site and a completion of the replication process at the second processing site, and
      switch the system to an acute replication latency state when the estimated replication latency rises above the maximum replication latency threshold and switch out of the acute replication latency state when the estimated replication latency falls below the reset threshold, wherein the query workload is distributed to only the first processing site when the system is in the acute replication latency state.

9. The system of claim 8, wherein the reset threshold is less than the maximum replication latency threshold.

10. The system of claim 8, wherein the processor is further configured to switch out of the acute replication latency state directly into a normal replication latency state of the plurality of sites when the estimated replication latency falls below the reset threshold.

11. The system of claim 8, wherein query workload is distributed to the first processing site and the second processing site when the system is in the normal replication latency state.

12. The system of claim 10, wherein the processor is further configured to define at least one other replication latency state over a range of replication latency values between the normal replication latency state and the acute replication latency state, wherein the at least one other replication latency state favors use of a single-site distribution configuration.

13. The system of claim 12, wherein the processor is further configured to switch from the normal replication latency state to the at least one other replication latency state when the estimated replication latency lies within the defined range.

14. The system of claim 13, wherein the processor is further configured to estimate the replication latency as an average of replication latencies of the workload over a selected time interval.

15. A method of operating a system of independent processing sites, comprising:
   defining, using a processor, a maximum replication latency threshold and a reset threshold of the system;
   providing an update workload to a first of the plurality of processing sites;
   providing the update workload from the first of the plurality of processing sites to another of the plurality of processing sites;
   estimating a replication latency of a workload in the system as a difference in time between completion of a transaction at a first of the processing sites and a completion of a replication process of the transaction at another of the plurality of sites;
   switching the system to a first replication latency state when the estimated replication latency rises above the maximum replication latency threshold, wherein a query workload is provided to only the first of the processing sites in the acute replication latency state; and
   switching the system out of the first replication latency state to a second replication latency state when the estimated replication latency falls below the reset threshold.

16. The method of claim 15, wherein the reset threshold is less than the maximum replication latency threshold.

17. The method of claim 15, wherein the first replication latency state includes an acute replication latency state and the second replication latency state includes a normal replication latency state.

18. The method of claim 17, further comprising defining at least one replication latency state over a selected range of replication latency values between the normal replication latency state and the acute replication latency state.

19. The method of claim 18, further comprising switching from the normal replication latency state to the at least one other replication latency state when the estimated replication latency lies within the selected range of replication latency values.

20. The method of claim 15, wherein estimating the replication latency of the workload further comprising obtaining an average of replication latencies for the workload over a selected time interval.

* * * * *